April 21, 1936.   C. G. MUNTERS   2,037,813
HEAT INSULATION
Filed March 23, 1933   2 Sheets-Sheet 1
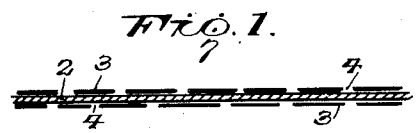
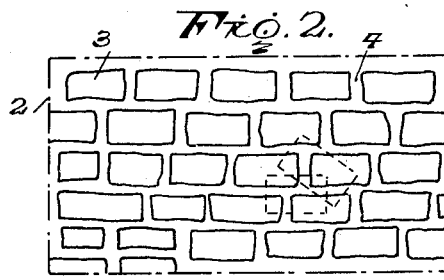
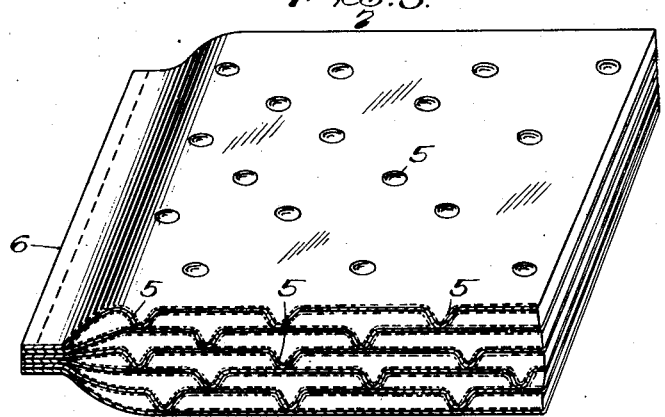
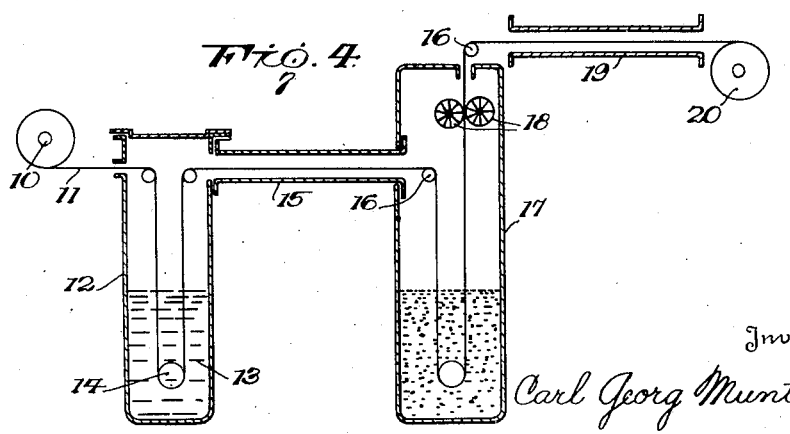
Inventor
Carl Georg Munters.
By Cameron, Kerkam & Sutton
Attorneys April 21, 1936.  C. G. MUNTERS  2,037,813
HEAT INSULATION
Filed March 23, 1933  2 Sheets-Sheet 2
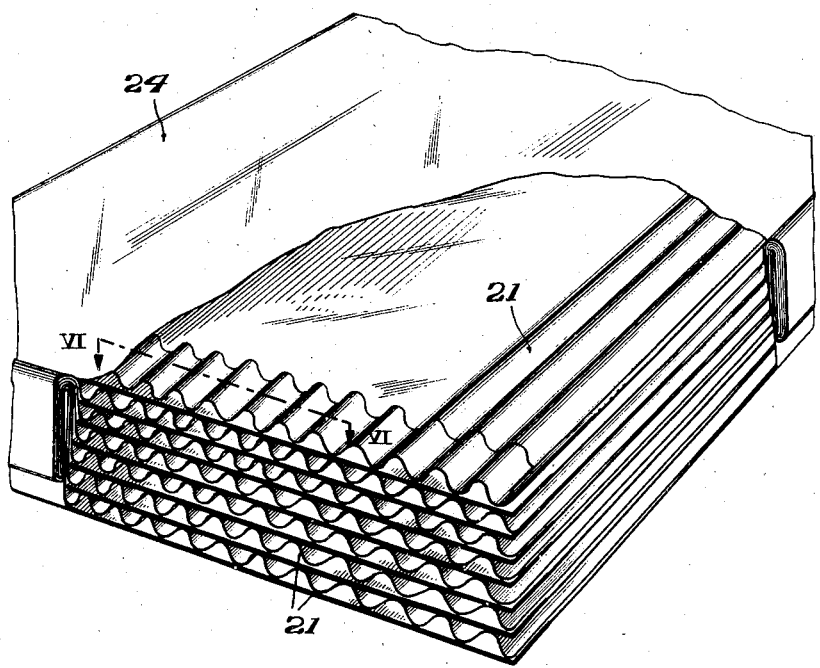
Fig. 5.
Fig. 6.
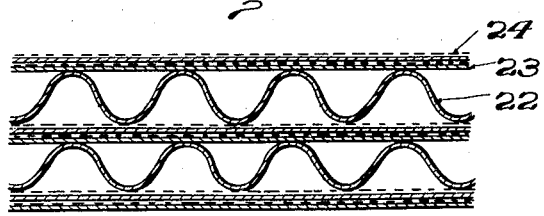
Inventor
Carl Georg Munters
By Cameron, Kerkam & Sutton
Attorneys Patented Apr. 21, 1936

2,037,813

UNITED STATES PATENT OFFICE 2,037,813

HEAT INSULATION

Carl Georg Munters, Stockholm, Sweden, assignor to Aktiebolaget Termisk Isolation, Stockholm, Sweden, a corporation of Sweden Application March 23, 1933, Serial No. 662,355
In Sweden April 4, 1932

2 Claims. (Cl. 154—44)

This invention relates to heat insulation, and more particularly to heat insulating elements and units formed of a plurality of elements constructed and assembled to efficiently oppose heat transfer by radiation and convection as well as by conduction.

It has heretofore been proposed to form heat insulation of elements comprising continuous sheets of foil, preferably polished, of suitable metal, for example aluminum, to minimize passage of heat transversely therethrough by radiation and convection, and it has also been proposed to form heat insulation of elements formed by attaching continuous sheet foil to suitable backing material of poor heat conductivity, for example paper. However, whether the elements are formed of foil supported on backing sheets, or of foil alone, with the elements spaced by interposed supports, spacers or the like, heat is conducted along the continuous foil, and to adjacent foil sheets through the interposed supports or spacers, reducing the efficiency and effectiveness of the insulation. In order to reduce the cost of manufacture it has also been proposed to insert foil in a crumpled or crushed form in the insulating-forming space, so as to form a relatively large number of separated spaces defined by the crumpling of the foil, but the walls limiting these spaces come in contact with each other at many points, and even though the sheets of foil are extremely thin, heat is conducted therealong to their points of contact, and through the latter to the adjacent sheets, with the result that the effectiveness of the insulation is greatly decreased.

It is an object of this invention to provide insulation which overcomes the foregoing difficulties and defects, and more particularly to provide heat insulation which is highly effective to reduce heat transfer by reflection and which at the same time is highly effective to reduce heat transfer by conduction both in the plane of the component elements and between succeeding elements of the insulation.

Another object of this invention is to provide an improved insulating element formed of a sheet of material of poor heat conductivity which is provided over a large proportion of its surfaces with thermally disconnected heat reflecting particles or pieces so as to secure a maximum efficiency in heat reflection while minimizing heat conduction.

Another object of this invention is to provide improved insulation composed of a plurality of elements which are so assembled and connected that heat transfer between the succeeding elements, and also convection between the intermediate gas layers, are minimized.

Other objects of the invention will appear as the description thereof proceeds.

In accordance with the present invention, continuous sheets of foil, along the surfaces of which heat may be conducted, are avoided, and in place thereof use is made of thermally separated foil-like inserts which are supported on a carrier or backing of material of poor heat conductivity, for example paper. Said inserts are preferably of relatively small dimension and may take the form of flakes, scales, powder, granules or the like, preferably of metal such as aluminum. The backing or carrier of poor heat conductivity, for example paper, is preferably thin and impregnated with oil, for example linseed oil, paraffin or other suitable impregnating material, which desirably renders the backing waterproof, and may also be selected so that the backing is fireproof, and which may also act as the adhesive for securely retaining the said inserts on said backing.

The invention is capable of receiving a variety of expressions, some of which are illustrated on the accompanying drawings, but it is to be expressly understood that the drawings are for the purpose of illustration only, and are not to be construed as a definition of the limits of the invention, reference being had to the appended claims for that purpose.

Referring in detail to the drawings, wherein the same reference characters are employed to designate corresponding parts in the several figures, Figs. 1 and 2 respectively show diagrammatically, and on an enlarged scale, a section and an elevation of an insulating element constructed in accordance with the present invention;

Fig. 3 shows an insulating unit consisting of a plurality of insulating elements combined in accordance with the present invention;

Fig. 4 shows diagrammatically a suitable process and apparatus for producing the sheet elements of Figs. 1 and 2;

Fig. 5 is a view of another embodiment of the present invention; and

Fig. 6 is an enlarged sectional and diagrammatic view taken on the line VI—VI of Fig. 5.

In the form shown in Figs. 1 and 2 a backing or carrier 2 of any suitable material of poor heat conductivity, and of any suitable thickness and size, is provided with a large number of small thermally separated particles or pieces 3 adapted to provide heat reflecting surfaces and preferably formed of metal, such as aluminum. Said backing or carrier 3 preferably consists of paper, as thin as possible, although other similar materials of poor heat conductivity may be employed in order to oppose heat conduction lengthwise thereof. The particles or pieces 3 may be of any suitable material and formed in any suitable way. They may consist of hammered or ground metallic powder, or they may be scale-like or flake-like in character, and are preferably formed of aluminum. In order to show the invention clearly these small pieces are shown as placed at exaggeratedly great distances from each other, but they should be substantially spaced from each other, so as to be thermally separated. Hence, as is apparent especially from Fig. 2, heat conduction along the surfaces of the sheet elements through the metal pieces 3 is largely, if not completely, precluded by the intermediate spaces 4 of the backing material of poor heat conductivity. Therefore, the heat insulating capacity of the sheet element is materially increased as compared with continuous sheets of foil, whether or not supported by a backing of poor heat conductivity, because of the facility with which heat can be conducted along the surfaces of the latter.

The particles or pieces 3 may be distributed over one or both sides of the backing strip 2 by means of any suitable spreading or sprinkling device. The backing, as paper, is preferably impregnated with suitable material, such as paraffin, oil such as linseed oil, wax, etc., before the particles 3 are applied thereto, and said particles are preferably retained on said backing by said impregnating material. Hence said particles are preferably applied to the backing before the impregnating material in the latter has become completely dry. Sometimes during the application of the particles 3 to the backing they may so adhere as to overlap, as shown in broken lines in Fig. 2, but even so, transmission of heat along the surface of the sheet element is greatly reduced as compared with a complete sheet of foil because there is always a relatively large number of intermediate spaces between any such small groups of superposed pieces. Moreover, transfer of heat between even the superposed pieces is rendered relatively difficult, because they may contact only through a very small surface, and additionally because there may be some of the impregnating material separating the superposed pieces.

After the small particles or pieces have been distributed upon the backing strip, the excess is removed by any suitable means, and the means for removing the excess particles may also desirably operate to polish the exposed surfaces of those pieces which adhere to the backing strip. In any event, as said particles 3 are retained on the backing only by the impregnating material, so that there is no layer of lacquer or adhesive covering the faces thereof, the full heat reflecting capacity of said exposed faces is available. Hence each sheet has a good heat reflecting surface over a major portion of one or both of its faces. The heat reflecting capacity of the surface thus produced is somewhat less than a continuous polished sheet of foil, but this deficiency is adequately compensated for by the advantage obtained by the prevention of heat transmission by conduction along the surface thereof. Additionally, the sheet elements made in conformity with the present invention can be produced much more inexpensively than polished continuous aluminum sheets as heretofore used. Hence it is possible to use a larger number of sheet elements made in conformity with the present invention, and thereby increase the effectiveness of the insulation, without increase in cost, while heat transfer by convection and radiation is considerably diminished.

An insulation unit composed of a plurality of elements produced in conformity with the present invention is shown in Fig. 3. This unit consists of a plurality of superposed or juxtaposed sheet elements of the type above described, said elements being here shown as provided with projections or convexities 5, formed in any suitable way as by pressing them into the body of the element while in a more or less plastic condition, which maintain the sheet elements in predetermined spaced relation. The projections may be pressed from the individual sheets in both directions, although in the form shown they project from the sheets in one direction only. Said sheet elements are united into a mat-like unit in any suitable manner after they have been properly assembled with respect to each other, as by gluing or sewing along the edges 6. Hence the intersheet spaces are out of communication with each other to prevent flow of gas between said spaces.

The unit may also be built up into an insulating mat from individual sheets by assembling undeformed sheets between sheets provided with convexities 5, as hereinafter explained more in detail in connection with the embodiment of Figs. 5 and 6, wherein the convexities take the form of corrugations extending widthwise of the unit. For example, every alternate sheet may have a smooth surface, or there may be two or more sheets provided with convexities 5 between the succeeding plane sheet elements. In order to impart rigidity and strength to the finished unit, the outermost sheets may consist of elements having a thicker backing, for example cardboard, oilcloth, or the like, or the unit may if preferred be provided with an exterior covering of suitable material for the same purpose. Insulating units, mats or walls of this type can be made of predetermined sizes according to the requirements, and the insulation of a chamber or space may be effected very simply by wrapping predetermined lengths of such a mat therearound, or the mat may be made of sufficient thickness so that a single layer thereof affords a sufficient insulation for the refrigerator or heat retaining cabinet or other article to be insulated. The mat or unit may be subdivided into areas or panels by sewing together or otherwise uniting the sheet elements in predetermined spaced relationship so that desired portions or lengths thereof may be readily cut from or out of the mat or unit in order to obtain pieces of suitable sizes for the article to be insulated. Also, in order to hold the sheet elements together between such seams or connecting points the projections 5 may be coated, during the production of the mat, with glue or other adhesive so as to connect the sheets together in their superposed relationship, or the uniting of the elements may be effected in any other suitable way.

An apparatus for the production of the insulating sheets in accordance with the present invention is diagrammatically illustrated in Fig. 4. In this figure, 10 designates a roller which carries a roll of paper or other suitable backing material 11. From this roller the backing material is passed into a receptacle 12 which contains the impregnating material 13, for example molten wax, paraffin, oil such as linseed oil, or the like. In the form shown the strip is passed over a roller 14 in said receptacle to assure proper period of impregnation, and from the latter the strip is passed to a drying apparatus 15 disposed at the rear of the receptacle 12. Then the strip passes over a guide roller 16 into a receptacle 17 where the surface thereof is brought into intimate contact with the metal flakes, foil pieces, powder, granules or the like, for example aluminum particles. The strip is run through said metalliferous material to cause the latter to adhere to the surface of the strip while the impregnating material is in suitable condition to cause the adhesion. The strip then passes through wiping or brushing mechanism 18, here shown as consisting of two brushes, which remove the superfluous material from the surface of the strip and eliminate undesired cohesions between the individual particles. At the same time the brushes may give the metalliferous particles a polished surface. Also if the particles project above the surface of the strip the brushes flatten them out or lay them down upon the strip so that the surface is uniform and smooth. Upon leaving receptacle 17 the strip passes through a second drying device 19, to finally dry the impregnating material with the metal particles adhering to the strip, and the finished sheet element is then wrapped on a roller 20. It is to be understood that guide rollers 16 may be provided at any point in which the direction of the strip is changed.

It will therefore be perceived that the powdered or flaked material is disposed on the finished sheet with its outer surface free and uncovered, because of the process heretofore described, whereby the pieces adhere to the backing only on the side adjacent the latter, and the polished faces thereof are uncovered so as to obtain a maximum efficiency in heat reflection.

Instead of the device illustrated at 12 for impregnating the paper with paraffin, oil or wax, other suitable means may be provided for coating the paper strip, for example the impregnating material may be applied by coated rollers which apply said material to the paper. Also, instead of passing the paper strip through the mass or powder or flaky material in receptacle 17 the coating of the strip may be effected by means of a blower or other apparatus which causes the metal pieces to eddy around in the chamber traversed by the paper strip. The drying of the impregnated paper, both during the passage from the impregnating receptacle 12 to the receptacle 17, and also after leaving the latter, may be effected by any suitable means, as by heating by means of steam, hot air, etc. Paper or the like which has already been coated with paraffin may also be employed as the initial material for producing the sheet elements, in which event the receptacle 12 may be omitted. In this case the paper may be passed over a roller or other suitable means to warm the strip and soften the impregnating material either before or during the coating thereof with the metalliferous material, or the receptacle 17 may be retained in a heated condition to effect the same result. The use of paraffin as the impregnating material is particularly advantageous in that it is completely odorless.

In the form shown in Figs. 5 and 6 the sheet elements which constitute the insulating mat, and which may be produced in accordance with the present invention although this feature of the invention is applicable to the formation of insulating mats from sheet elements of other construction or character, are retained in position by means of special spacers which may consist of strips 21 of corrugated cardboard disposed in the form of a frame along the edges of the insulating elements, or they may extend coextensively with the area of the insulating elements. These spacers may also be formed of a laminated structure composed of corrugated portions 22 and flat portions 23 connected to the crests of the corrugations. The insulating sheet elements 24 are attached to the spacing elements 21 in any suitable manner, as by gluing, and the projecting edges of the sheets are preferably folded or pleated and glued together so as to prevent circulation between the gas layers intermediate said sheets. These spacers 21 are also preferably so constructed that the corrugations 22 extend parallelly to each other in the corners of the frame, so as to facilitate nesting, and the corrugations also preferably extend parallelly to the edge of the unit so as to provide rigidity.

Insulating elements constructed in accordance with the present invention may be given any suitable shape corresponding to the walls to be insulated. In insulating a box, as for a refrigerator or the like, the following procedure may be used: A model which corresponds to the inner wall of the box may be prepared and an insulating sheet element may be wrapped therearound as it is withdrawn from a roll, while spacers, such as those heretofore described, may be simultaneously wrapped with and glued to the sheet element. After the sheet element prepared in this manner has attained sufficient thickness, it can then be inserted between the inner and outer walls of the refrigerator. Other materials than here illustrated may be used as spacers, and these spacers may also be rendered waterproof by suitable treatment, if desired, such as above proposed for the backing material. The backing material or the spacers may be treated with bakelite, cellulose lacquer, celluloid, varnish, resin or the like, and under certain circumstances the spacers may be made of glass, glass wool, asbestos board, etc. Moreover, the material used for the backing or the spacers may also be made fireproof, as for example by treatment with water glass.

Insulating material in the form of slabs or the like, of suitable shape, form and dimensions, may be also advantageously constructed by crumpling or crushing sheet elements made in accordance with the present invention and then pressing the same into plates of suitable configuration. In such case the plates may be provided with suitable stiffening members in order to obtain sufficient rigidity. The backing of the elements may also be impregnated with synthetic resin or the like for retaining the metalliferous pieces thereon so that the backing sheets, upon compression and simultaneous heating, will form a stiff insulating plate suitable for the desired purpose. Crumpled or crushed forms as just described can thus be employed, owing to the manner of their formation, in the construction of insulating elements for devices that do not permit or that render difficult the use of insulating units of the character earlier described.

In the production of insulating units, such as shown in Figs. 3, 5 or 6, a plurality of paper strips may be simultaneously coated with the metalliferous pieces and then passed through apparatus which continuously assemble and cement the strips into a unit, which unit may thereafter be cut into suitable lengths in any appropriate manner.

Insulating units composed of juxtaposed sheet elements with interposed spacers as heretofore described have the sheet elements preferably spaced less than five millimeters apart, the preferred spacing being from three to five millimeters.

While the embodiments of the invention illustrated on the drawings have been described with considerable particularity, it is to be expressly understood that they have been selected for purposes of exemplification only, and as various other embodiments of the invention will now readily suggest themselves to those skilled in the art, reference is to be had to the appended claims for a definition of the limits of the invention.

What is claimed is:

1. In an insulating structure, a surface faced with heat reflecting particles, adjacent particles being closely spaced and to a major extent non-contacting to permit reflection and deter conduction of heat along said surface.

2. Insulation including a plurality of sheets, crumpled to provide spacing and relatively little contact, each sheet being faced with heat reflecting particles, adjacent particles being closely spaced and to a major extent non-contacting to permit reflection and deter conduction of heat along the respective sheets.

CARL GEORG MUNTERS.